United States Patent Office 2,844,502
Patented July 22, 1958

2,844,502

METHOD OF BONDING ELASTOMERS TO OTHER MATERIALS AND ADHESIVE COMPOSITIONS USED THEREFOR

Homer W. Paxton, Passaic, N. J., assignor to United States Rubber Company, New York, N. Y., a corporation of New Jersey No Drawing. Application August 31, 1954
Serial No. 453,415

13 Claims. (Cl. 154—139)

This invention relates to new adhesives for bonding elastomers to themselves or to other materials. In a preferred form, it relates to adhesives for bonding elastomers to textile materials such as nylon, rayon, or cotton.

This application is a continuation-in-part of my application Serial No. 385,265, filed October 9, 1953, now abandoned.

Heretofore, it has been extremely difficult to bond elastomers to nylon, and only slightly less difficult to bond them to rayon. Usually, at least two or three coats of an adhesive whose composition must be varied from one coat to the next must be used. This complex operation obviously greatly increases the cost of bonding the elastomer to the textile material, as in making tires, footwear, or other composite elastomer-fabric articles. The bonding of elastomers to cotton is not usually as difficult as the bonding of elastomers to nylon, rayon, or other synthetic fibers, but even with cotton it is sometimes necessary to resort to complicated and expensive operations such as the use of multiple coatings.

It has now been found that these difficulties can be eliminated by the use of a new class of bonding agents. These new agents are made from a mixture of a certain phenolic resin with an adduct, made at high temperature, i. e., about 175–225° C., of an olefinic elastomer and maleic anhydride. The components are dissolved or dispersed in an organic liquid to form the new adhesive cements of this invention.

The elastomer-maleic anhydride adducts usually are made by chemical reaction between the two said materials in the presence of one or more inhibitors of free-radical polymerization.

The elastomer can be any which has olefinic unsaturation, e. g., Hevea rubber and any synthetic rubber which has at least 1% olefinic unsaturation; i. e., is a polymer made from at least 1% of a conjugated diolefin. These synthetic rubbers can be either homopolymers or heteropolymers of such a diolefin. Typical of such elastomers are polybutadiene, polyisoprene, the styrene:diolefin copolymers (known generically as GR–S), the acrylonitrile:diolefin copolymers (known generically as GR–A), the acrylic ester:diolefin copolymers, the monovinylpyridine:diolefin copolymers, and the isobutylene:diolefin copolymers (known generically as Butyl rubbers and as GR–I).

The adducts are not fully equivalent among themselves, either in the method of preparation or in their use in the adhesives of this invention.

The elastomers used in making the adducts are divisible into the following groups according to their behavior during preparation of the maleic adducts: namely, the natural rubbers, e. g., Hevea rubber; the highly unsaturated synthetic rubbers, e. g., GR–S, GR–A, the acrylate:diolefin elastomers, the vinylpyridine:diolefin elastomers and polybutadiene; and the Butyl rubbers.

Hevea rubber reacts chemically with maleic anhydride at a temperature between 175° C. and 225° C. to form adducts which can be processed on conventional rubber machinery and can be dissolved in suitable organic solvents. This reaction is preferably carried out in an internal rubber mixer such as a Banbury. Customarily, one or more inhibitors of free-radical polymerization are added to the mixture before the reaction takes place. While adducts suitable for use in this invention can be made in the absence of such inhibitors, the adducts made in their presence have lower gel content and are more easily made into cements than are the adducts made in the absence of said inhibitors.

In contrast, the adducts of the highly unsaturated synthetic elastomers must be made in the presence of inhibitors of free-radical polymerization. In the absence of such inhibitors, unprocessable, insoluble, crumbly materials are obtained. The adducts of these synthetic elastomers are preferably made in a Banbury. These new adducts are described in a copending application by Snyder and Paxton, Serial No. 342,748, filed March 16, 1953, now abandoned.

The adducts of Butyl rubber are made in the absence of inhibitors other than those incorporated in the rubber during its manufacture. In fact, even such inhibitors are unnecessary for the successful operation of this invention.

Typical adducts are made as follows, all parts being by weight:

PROCESS A

*(For highly unsaturated synthetic elastomers)*

One, or a mixture of two or more, high-unsaturation, synthetic elastomers (100 parts) is masticated in a Banbury mixer for a short time at 120–150° C. Then one part of N-phenyl-beta-naphthylamine, one part of triphenyl phosphite and the desired amount of maleic anhydride are added in the order listed, as rapidly as possible, and mixed for a short time. The mixing operation causes the temperature to rise, and the heating may be aided by external heat. The addition reaction begins when the temperature of the mixture has risen to about 175° C. The temperature of the mixture is held at 205–235° C. until the reaction appears to be complete. (This time of reaction varies, depending on the size of the mixer and batch, the temperature, and on the proportion of maleic anhydride added, roughly between 10 and 60 minutes.) Heat is turned off and cooling water turned on. Then one part each of BLE (an acetone-diphenylamine condensate) and of 2,6-ditert.-butyl-4-methylphenol are added and mixed in. Finally, the product is removed from the Banbury and sheeted out on a cold mill for storage or immediate use. These amounts of inhibitors mentioned are in addition to that amount customarily incorporated in the elastomer during manufacture.

The adducts of maleic anhydride and synthetic elastomers can be made by many variations of this process, as described by Snyder et al., loc. cit. I can use in my process adducts made by any of the methods and in the presence of any of the inhibitors disclosed by Snyder et al.

PROCESS B

*(For Hevea rubber)*

The adducts of Hevea rubber and maleic anhydride are made by process A except that the inhibitors can be omitted, if desired. However, my preferred adhesives are made from Hevea adducts made in the presence of the inhibitors.

The amount of maleic anhydride used in making these new adducts by processes A and B can be varied widely, as described in the said Snyder et al. application. When the adducts are to be used in the new adhesives of this invention a feed ratio between about 3 parts and 15 parts of maleic anhydride per 100 parts of elastomer is suitable. Preferably, the feed ratio is between about 5 parts and 12 parts of maleic anhydride per 100 parts of elastomer. The amount of maleic anhydride which combines with the elastomer is always somewhat less than that in the feed because some of it vaporizes and escapes from the Banbury. The amount of loss, of course, varies with the individual Banbury, the time, the operating temperature, and with the amount of maleic anhydride in the feed, so that the exact amount of combined maleic anhydride varies. However, by a few simple experiments the feed ratio to be used under any given conditions can be determined, and the operation standardized for that particular Banbury. The reaction is continued until substantially all of the unvolatilized maleic anhydride has reacted, the completion of the reaction being shown by the substantial absence of the odor of maleic anhydride in the hot adduct.

PROCESS C (For Butyl rubber)

A charge of 100 parts of Butyl rubber and 5–10 parts of maleic anhydride is mixed in a Banbury for a few minutes at a low temperature, e. g., below 100° C., to effect uniform dispersion. Then 1,3 - dichloro - 5,5 - dimethylhydantoin (4 parts), an accelerator for the desired reaction, is added, and the temperature of the mixture is raised as rapidly as possible to 160–175° C., and held there for 30 minutes by suitably adjusting the Banbury speed. During this time the adduct is formed. The stock then is dropped from the Banbury and stored at room temperature until used.

The use of the said accelerator and of other N-halogenated organic compounds as accelerators for making Butyl adducts is disclosed by P. F. Gunberg in copending application, Serial No. 434,073, filed June 2, 1954. Any of the modifications, e. g., change of accelerator, presence of carbon black, etc., described by Gunberg can be used in making adducts suitable for use in the adhesives of my invention. Other accelerators also can be used in making suitable adducts.

PROCESS D (For Butyl rubber)

Alternatively, Butyl adducts can be made without an accelerator. The rubber and the maleic anhydride are mixed on a cold mill or in a cold Banbury in the proportion shown above. The mixture is then heated in an autoclave with 60 parts of benzene for six hours at 180–200° C. to form the adduct. The benzene and excess maleic anhydride are separated from the adduct by extraction with methanol and then with water. This operation is carried out at or near room temperature in order to prevent esterification or hydrolysis of the anhydride groups.

I prefer to use the accelerated process C in making butyl adducts because of its ease. However, adducts made by process D are interchangeable with those made by process C in the operation of this invention.

The synthetic elastomers usable in process A are the synthetic homopolymers of a conjugated diolefin and the high unsaturation heteropolymers thereof, containing at least 15% of such diolefin, with one or more monoolefinic compounds copolymerizable therewith, such as styrene; a methylstyrene; an acrylic or methacrylic nitrile, amide, acid or ester; a monovinylpyridine; a fumaric ester; vinylidene chloride; methyl vinyl ketone; and methylisopropenyl ketone.

The conjugated diolefin used in making the elastomers preferably contains four to six carbon atoms. Commonly I use butadiene, but I can also use isoprene, piperylene, or 2,3-dimethylbutadiene.

The proportion of the said diolefin in rubbery heteropolymers thereof used in process A can be as little as about 15% of the total amount of copolymerizable monomers, the remainder being mono-olefinic compound. This proportion is customarily given as the feed ratio of the diolefin and the other monomer or monomers. Polymerization is generally but not necessarily effected in aqueous emulsion, by well-known techniques.

The diolefin-styrene copolymers with which I start are generically termed GR–S. They can be made by any of the commonly known methods of copolymerization, e. g., in emulsion at 50° C., 5° C., or −15° C.

The methylstyrene used can be alpha-methylstyrene, ortho-, meta-, or para-methylstyrene, or a mixture of any of them.

The acrylic type nitrile, amide, acid or ester is one having the structure

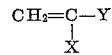

wherein X is hydrogen or methyl, and Y is —CN,

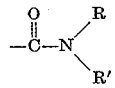

or —COOR, where R and R' are hydrogen, alkyl or aralkyl groups. The most widely used monomer from this group is acrylonitrile. Copolymers of acrylonitrile and butadiene, generically known as GR-A, are sold commercially under the names Paracril, Hycar, etc. Other important monomers in this group are the acrylic and methacrylic esters, such as methyl acrylate, ethyl acrylate, methyl methacrylate, butyl acrylate and 2-ethylhexyl acrylate.

The vinylpyridine can be an unsubstituted monovinylpyridine, e. g., 2-, 3-, or 4-vinylpyridine, or it can be an alkyl-substituted monovinylpyridine, e. g., 2-methyl-5-vinylpyridine, 5-ethyl-2-vinylpyridine, 2-methyl-6-vinylpyridine, and 2-ethyl-4-vinylpyridine.

The fumaric esters have the structure

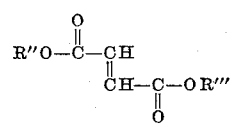

wherein R" and R''' are residues from alcohols which can be alike or different.

The conjugated diolefin used in making the isobutylene:diolefin elastomers used in process C and process D commonly is isoprene, but other diolefins, such as butadiene, piperylene or 2,3-dimethylbutadiene, can also be used.

The proportion of the diolefin in these elastomers can be varied between about 1% and about 25%. The commercially available elastomers contain about 1–5% of conjugated diolefin combined.

The phenolic resin used in this invention is Durez 12687, which is a phenol-formaldehyde resin modified with cashew nut shell oil as described by Shepard and Boiney U. S. Patent No. 2,532,374, resin examples 4 and 6, and which contains sufficient hexamethylenetetramine (or equivalent source of formaldehyde) to complete the conversion of the resin to the insoluble, infusible state when heat is applied. A mixture of Durez 12686 (100 parts) and hexamethylenetetramine (at least 8 parts) is equivalent to Durez 12687.

As is well-known (see U. S. Patent No. 2,532,374), cashew nut shell oil can serve as a source of material for condensation or reaction with a resinous phenol-aldehyde condensate to form, in the presence of a methylene-yielding hardening agent (hexamethylenetetramine or its known equivalent)—an insoluble, infusible resinous product. See also U. S. Patent No. 2,532,374 for reference to the same type of infusible product. Before hardening, the cashew nut shell oil-modified phenol-aldehyde condensate is a normally permanently fusible resin. It is such a modified resin which forms one of the essential components of the present organic solvent cement or adhesive composition. The primary phenols used are monohydric or polyhydric; e. g., phenol or its homologs (including cresylic acid), resorcinol, etc. Phenol is preferred, since together with formaldehyde, with which it is condensed, it furnishes the phenol-aldehyde portion of the cashew nut shell oil-modified commercial products known as Durez 12686 and 12687. The latter represent preferred embodiments used as the resinous portion of the present adhesive composition. The other essential component is the maleic anhydride-modified elastomer. Together the resin and the modified elastomer form a homogeneous mixture which when hardened by heat (with removal of the inert solvent) forms a firm adhesive bond for uniting together a wide variety of the same or different materials.

However, any cashew nut shell oil-modified phenolic resin made from cashew nut shell oil and a simple phenol and capable of being advanced to the insoluble infusible form when subjected to the action of heat while in intimate admixture with a methylene-yielding substance, typified by hexamethylenetetramine, may be employed in the practice of my invention. For brevity, the resinous component of the present cement will be referred to as a "cashew nut shell oil-modified phenol-aldehyde resin," or more particularly as a "cashew nut shell oil-modified phenol-formaldehyde resin."

The proportion by weight of adduct and resin can be varied between about 50:50 and 90:10, preferably between about 60:40 and 85:15.

The adduct and the resin are dissolved in a suitable solvent or mixture of solvents, either after being mixed on a rubber mill or by being added separately to the solvent.

When the adduct and the resin are pre-mixed in solid condition the solvent is chosen for its ability to dissolve the adduct, regardless of the solubility of the resin in it. In general, the adducts are soluble in the same solvents as the elastomers from which the adducts were made. For example, a mixture of a phenolic resin with an adduct made from Hevea rubber, GR–S, a monovinylpyridine rubber, an acrylate rubber or GR–I can be dissolved in an aromatic hydrocarbon such as benzene, toluene, or a xylene even though the phenolic resin be substantially insoluble in such a liquid. The adduct apparently either increases the solubility of the resin in the hydrocarbon, or it keeps the resin in so finely dispersed a state that it does not readily separate from the solution. Regardless of the mechanism, I describe my invention herein using the terms "solution" and "solvent." The adducts of acrylonitrile elastomers have limited solubility in aromatic hydrocarbons, but are soluble in more polar liquids such as butanone. The phenolic resin also is soluble in butanone.

When the adduct and the resin are dissolved separately, a suitable solvent, not necessarily the same, must be chosen for each material. The adduct is dissolved in an aromatic solvent, if soluble therein, or in butanone; and the resin is dissolved in butanone. Subsequently, the two solutions are mixed in any desired proportions.

The proportion of total solids in the solution is varied widely depending on the method used to apply it to the materials to be bonded. Any conventional method of applying the cement can be used. If it is to be sprayed, it is diluted to form a thin solution. If it is to be applied by a dipping operation or with a brush, it is used in somewhat more concentrated form. If it is to be applied with a doctor knife, it is used in such high concentration as to be almost a paste. However, the concentration is not critical, and may be varied to suit the operation, as is obvious to anyone skilled in the art.

As stated above, the various adducts used in this invention are not fully equivalent among themselves. Depending on the materials which are being bonded together, the adhesive is varied. In general, at least one of the materials to be bonded is an elastomer. I have found that while all of the adhesives of this invention have good bonding ability, I normally obtain the greatest bond strength when the adduct in the adhesive is made from the same elastomer which is being bonded. For instance, I prefer to bond Hevea rubber with an adhesive containing an adduct made from Hevea, to bond GR–S with an adhesive containing an adduct of GR–S, to bond Butyl rubber with an adhesive containing an adduct of Butyl rubber, etc. However, I can also use adhesives containing adducts of elastomers other than those being bonded.

My adhesives also are useful for bonding still other elastomers such as neoprene (polychloroprene) and polyisobutylene.

My adhesives can be made from mixtures of two or more adducts of the same elastomer differing in maleic anhydride content, or from mixtures of adducts made from different elastomers. My adhesives furthermore can be made from adducts formed by reacting maleic anhydride with a mixture of two or more elastomers; such adhesives are particularly useful in bonding two different elastomers together. Here again, in general, the elastomers used in the mixed adducts are preferably the same as those being bonded.

My adhesives are valuable not only for bonding elastomers to each other, but also for bonding an elastomer to other materials such as textiles, metals, wood, paper, and plastic materials, or for bonding any of these materials to themselves or to each other. These new adhesives are particularly useful in bonding elastomers to textile materials to form composite articles such as tires, rubber-soled shoes with cloth uppers, fire hose, garden hose, belting and diaphragms which have a fabric reinforcement. Typical textile materials are cotton, viscose rayon, and nylon, either uncoated or coated with long-chain quaternary ammonium compounds such as those used as waterproofing agents.

The following examples illustrate my invention. All parts and percentages are by weight.

EXAMPLE 1

An adduct of Hevea rubber and maleic anhydride (feed ratio 100:10) made by process A was dissolved in toluene to form a 13% solution. Separately, Durez 12687 was dissolved in butanone to form a 25% solution. These two solutions were blended in the proportion of 100 parts of the adduct solution and 22.3 parts of the resin solution, thereby forming a cement whose solid content was 70% adduct and 30% resin. This cement was brushed onto a nylon fabric and allowed to dry at room temperature until the coating was tacky. A conventional, compounded, unvulcanized Hevea rubber stock was pressed against the cemented surface, and the composite article was then heated in a mold under pressure for 45 minutes at 145° C. (optimum conditions for vulcanization of the rubber stock) to form a rubber sheet ⅛ inch thick having fabric adherent to the top surface. The composite sheet was cooled to room temperature, and cut into strips one inch wide. The strength of the adhesive was then measured, at room temperature and at 100° C., and also at room temperature after being soaked in water for 24 hours and then dried, by a standard stripping test on a Scott tensile tester. (All strengths are given in pounds per linear inch of width.) The pulls required to cause failure were 55, 35 and 65 pounds, respectively, under the three test conditions. In all cases the rubber failed rather than the adhesive.

To compare the strength of my new adhesive with one of the best of the adhesives conventionally used in the rubber industry, the commercial adhesive MDI–50 was applied to the nylon fabric according to the manufacturer's directions (du Pont Bulletin BL–230, dated February 25, 1949), and then the same compounded Hevea stock was bonded to it by the process described above. The pull required to separate the rubber and fabric was only 20 pounds at room temperature (the other two tests were not made). Failure occurred at the bond between rubber and fabric.

This example shows the tremendous superiority of my new cement over a conventional one widely used in the rubber industry.

EXAMPLE 2

Nylon fabric was bonded to a conventional Hevea shoe stock by the new cement described in Example 1, and the laminate was heated in gaseous ammonia for 60 minutes at 145° C. to vulcanize the shoe stock. The adhesion, determined at room temperature, as described in Example 1, was 26 pounds.

For contrast, various cements which do not illustrate this invention were also applied and tested in the same way. A cement of Hevea rubber dissolved in toluene gave only 0.5 pound pull; a cement of Durez 12687 dissolved in butanone gave 5.8 pounds pull; and a cement made from the maleic anhydride adduct, described in Example 1, dissolved in toluene, gave 4 pounds pull.

Thus, it is evident that my new adhesive composed of the maleic adduct and the phenolic resin is a very much stronger bonding agent than is either of the solid ingredients used separately.

EXAMPLE 3

An adduct of GR–S 101 (a commercial "cold" GR–S; feed ratio, 74 butadiene:26 styrene) and maleic anhydride (feed 7.5 parts per 100 parts of GR–S) made by process A was dissolved in toluene to form a 19% solution. To it was added a 50% solution of Durez 12687 in butanone, in the proportion of 100 parts of the adduct solution and 16.6 parts of the resin solution, to form a cement containing 23.6% total solids in the proportion 70% adduct and 30% resin. This cement was brushed onto a nylon fabric and a viscose rayon fabric. These fabrics were then treated, as shown in Example 1, except that they were plied to a GR–S 101 stock which had been compounded conventionally. Vulcanization and testing were carried out as described in Example 1. This cement gave 40 pounds pull at room temperature with nylon, and 28 pounds pull with rayon.

This example shows that a typical GR–S can be used to make the adduct portion of my new cements, and that both rayon and nylon can be bonded to elastomers.

Examples 1 and 3 show also that the proportion of elastomer to maleic anhydride can be varied.

EXAMPLE 4

A 20% solution in toluene of the Hevea:maleic anhydride adduct described in Example 1 was mixed with a 50% solution of Durez 12687 in butanone in such proportion that the total solids of the cement consisted of 71% of the adduct and 29% of the resin (100 parts of the adduct solution and 17 parts of the resin solution). This cement was spread onto nylon fabric and bonded, as shown in Example 1, in one test to an unvulcanized Butyl rubber stock conventionally compounded with sulfur, and in a second test to an unvulcanized Butyl rubber stock compounded with a resin curative (as shown below). Both test pieces were vulcanized in a mold under pressure at 168° C. The piece vulcanized with sulfur was heated for 15 minutes, and the other one for 25 minutes. In each case the time was chosen to give the optimum cure of the Butyl rubber. The time was not critical so far as the cement was concerned. The adhesion at room temperature, measured as shown in Example 1, between the nylon and the sulfur-cured stock was 12 pounds; that between the nylon and the resin-cured stock was 28 pounds.

The resin-cured Butyl rubber was compounded and cured by the process disclosed by P. O. Tawney and J. R. Little in a copending application, Serial No. 266,146, filed January 12, 1952. This stock comprised:

| | |
|---|---|
| GRI–15 [1] | 100 |
| Carbon black | 65 |
| Amberol ST–137 [2] | 12 |
| p-Toluenesulfonic acid [3] | 1 |

[1] A 98 : 2 isobutylene : isoprene copolymer rubber, according to Rubber Age 74, 561 (1954).
[2] A resol designated as made from p-octylphenol and formaldehyde in the presence of sodium hydroxide.
[3] The use of sulfonic acids as accelerators of the resol cure of Butyl rubber is disclosed and claimed in copending application, Serial No. 385,689, filed October 12, 1953.

EXAMPLE 5

A masterbatch was made by blending 100 parts of the Hevea-maleic anhydride adduct described in Example 1, 100 parts of GR–I–15, 65 parts of carbon black, 10 parts of Amberol ST–137, 30 parts of Durez 12686, and 4 parts of paraformaldehyde on a mill. This masterbatch was dispersed in toluene to form a cement having 25% total solids. This cement was used to bond nylon fabric to each of the Butyl stocks shown in Example 4, and the plied stocks were cured as shown therein. The adhesion at room temperature was 15 pounds with sulfur-cured butyl, and 19 pounds with resin-cured butyl.

This example shows that the adduct and resin cements of this invention can be compounded with other materials.

EXAMPLE 6

An emulsion copolymer of butadiene and styrene (feed ratio 50:50) was reacted with maleic anhydride in the proportion 100:10 by process A. This adduct was blended on a mill with Durez 12687 in the proportion 100:40. The blend was then dissolved in toluene. This cement was used to bond nylon fabric to the resin-cured stock shown in Example 4. Curing and testing were carried out as shown therein. The adhesion was 20 pounds.

Examples 3 and 6 show that butadiene-styrene copolymers which vary widely in composition are operable in my invention.

EXAMPLE 7

Paracril C (acrylonitrile:butadiene copolymer, 35:65) was reacted with maleic anhydride in the proportion 100:10 by process A. This adduct was blended on a mill with Durez 12687 in the proportion 70:30. The blend was then dissolved in butanone. This cement was used to bond nylon fabric to Paracril C. Adhesion was very good.

EXAMPLE 8

A cement, made like that described in Example 7, except that the proportion of adduct:resin was 50:50, also gave good adhesion between nylon and Paracril C.

EXAMPLE 9

A mixture was made by blending 100 parts of a GR–I–15:maleic anhydride adduct (made by process D), 65 parts of carbon black, 30 parts of Durez 12687 and 10 parts of Amberol ST–137 on a mill. This mixture was dispersed in toluene to form a cement having 25% total solids.

This cement was used to coat nylon tire cord, which was then bonded in an "H" test mold to an unvulcanized Butyl stock which had been conventionally compounded with sulfur, carbon black and accelerators. The test piece was vulcanized and then tested. (The "H" test is described by Lyons, Nelson and Conrad, India Rubber World, 114, 213 et seq. (1946).) The pull required to separate the coated cord from the cured Butyl stock was 16.5 pounds at room temperature. The adhesion between the same Butyl stock and uncoated nylon cord; i. e., there was no adhesive layer, was only 4.8 pounds.

The new cement of Example 9 also was tested as a bonding agent between the same cured Butyl stock and nylon fabric by the one-inch stripping test described in Example 1. The adhesion was 43 pounds at room temperature, 10 pounds at 100° C., and 7 pounds at 121° C.

This example shows that adducts of Butyl rubber and maleic anhydride can be used to form valuable cements according to my invention.

Having thus described my invention, what I claim and desire to protect by Letters Patent is:

1. An adhesive composition comprising a soluble, processable, chemical adduct of maleic anhydride and an elastomer selected from the class consisting of Hevea rubber; synthetic, rubbery homopolymers of an conjugated diolefin; rubbery heteropolymers of at most 85% of a monoolefinic compound and at least 15% of a conjugated diolefin; and rubbery copolymers of from about 95% to about 99% of isobutylene and from about 5% to about 1% of a conjugated diolefin; and in addition a cashew nut shell oil-modified phenol-aldehyde resin.

2. An adhesive composition comprising an organic solvent cement of a soluble, processable, chemical adduct of maleic anhydride and an elastomer selected from the class consisting of Hevea rubber; synthetic, rubbery homopolymers of a conjugated diolefin; rubbery heteropolymers of at most 85% of a monoolefinic compound and at least 15% of a conjugated diolefin; and rubbery copolymers of from about 95% to about 99% of isobutylene and from about 5% to about 1% of a conjugated diolefin; and in addition a cashew nut shell oil-modified phenol-formaldehyde resin.

3. An adhesive composition comprising a chemical adduct of maleic anhydride and an elastomer selected from the class consisting of Hevea rubber; synthetic, rubbery homopolymers of a conjugated diolefin; rubbery heteropolymers of at most 85% of a monoolefinic compound and at least 15% of a conjugated diolefin, which adducts of the said homopolymers and heteropolymers are prepared in the presence of an inhibitor of free-radical polymerization; and rubbery copolymers of from about 95% to about 99% of isobutylene and from about 5% to about 1% of a conjugated diolefin; and in addition a cashew nut shell oil-modified phenol-formaldehyde resin.

4. An adhesive composition comprising a chemical adduct of maleic anhydride and a rubbery copolymer of from about 95% to about 99% of isobutylene and from about 5% to about 1% of a conjugated diolefin, and in addition a cashew nut shell oil-modified phenol-aldehyde resin.

5. A composite article embodying an elastomer bonded to another material by means of an adhesive composition as set forth in claim 1.

6. A composite article embodying an elastomer bonded to another material by means of an adhesive composition as set forth in claim 2.

7. A composite article embodying an elastomer bonded to another material by means of an adhesive composition as set forth in claim 3.

8. A composite article embodying an elastomer bonded to another material by means of an adhesive composition as set forth in claim 4.

9. A composite article embodying an elastomer bonded to a textile material by means of an adhesive composition as set forth in claim 1.

10. A method of bonding an elastomer to other materials by applying and interposing between said elastomer and the other material a cement of an adhesive composition as set forth in claim 1, and heating the assembly until the elastomer and the other material are firmly bonded together.

11. An adhesive composition comprising a soluble, processable, chemical adduct of maleic anhydride and an elastomer selected from the class consisting of Hevea rubber; synthetic, rubbery homopolymers of a conjugated diolefin; rubbery heteropolymers of at most 85% of a monoolefinic compound and at least 15% of a conjugated diolefin; and rubbery copolymers of from about 95% to about 99% of isobutylene and from about 5% to about 1% of a conjugated diolefin; and in addition a cashew nut shell oil-modified phenol-aldehyde resin capable of being converted to the insoluble, infusible form by the action of a methylene-yielding hardening agent and heat.

12. A composite article embodying an elastomer bonded to a textile material composed of nylon by means of an adhesive composition as set forth in claim 1.

13. A composite article embodying an elastomer bonded to a textile material composed of viscose rayon by means of an adhesive composition as set forth in claim 1.

References Cited in the file of this patent

UNITED STATES PATENTS

| | | |
|---|---|---|
| 2,532,374 | Shepard et al. | Dec. 5, 1950 |
| 2,652,353 | Wilson | Sept. 15, 1953 |

FOREIGN PATENTS

| | | |
|---|---|---|
| 507,995 | Great Britain | June 23, 1939 |
| 572,862 | Great Britain | Oct. 26, 1945 |